April 30, 1946. C. SEIPPEL 2,399,394
PRESSURE EXCHANGER
Filed Feb. 2, 1942 3 Sheets-Sheet 1
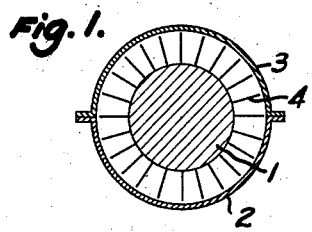
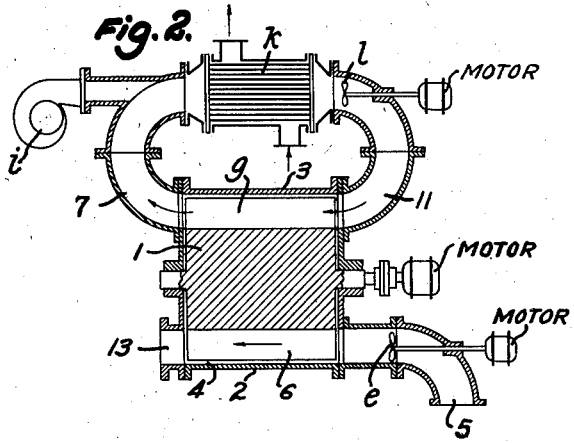
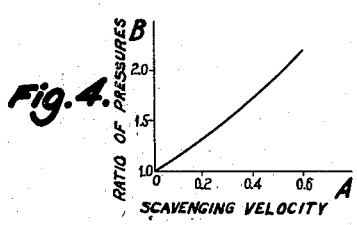
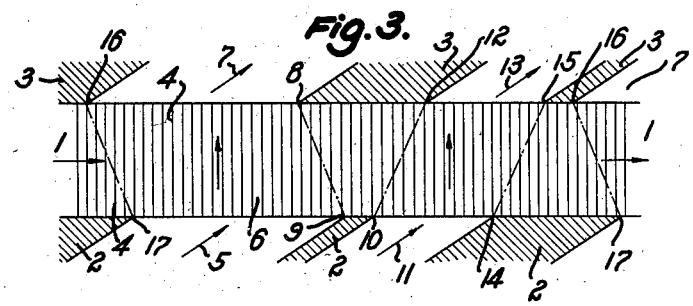
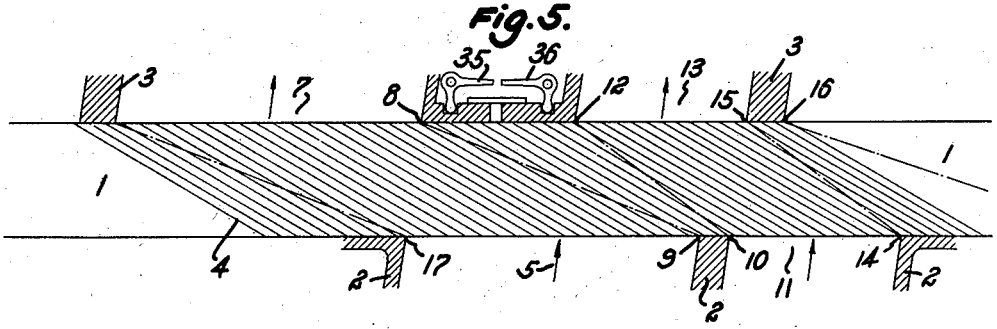
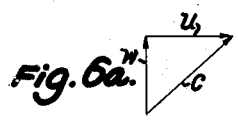
Inventor:
Claude Seippel,
By Pierce Scheffler,
Attorneys.

April 30, 1946.　　　C. SEIPPEL　　　2,399,394
PRESSURE EXCHANGER
Filed Feb. 2, 1942　　　3 Sheets-Sheet 2

Inventor:
Claude Seippel,
By Pierce & Scheffler
Attorneys.

April 30, 1946.  C. SEIPPEL  2,399,394
PRESSURE EXCHANGER
Filed Feb. 2, 1942  3 Sheets-Sheet 3

Inventor:
Claude Seippel,
By Pierce & Scheffler,
Attorneys.

Patented Apr. 30, 1946

2,399,394

UNITED STATES PATENT OFFICE 2,399,394

PRESSURE EXCHANGER

Claude Seippel, Ennetbaden, Switzerland, assignor to Aktiengesellschaft Brown, Boverie & Cie., Baden, Switzerland, a joint-stock company Application February 2, 1942, Serial No. 429,352 In Switzerland December 7, 1940

15 Claims. (Cl. 60—41)

A pressure exchanger is a machine which takes in a gas, for instance air, at a lower pressure stage, compresses it and delivers it at a higher pressure stage, whilst at the same time the machine expands a different gas or the same gas in a different condition from the higher to the lower pressure stage. Pressure exchangers are used for refrigerators, heat pumps, gas turbines, charging sets for combustion engines, chemical processes, pressure fired steam boilers, and the like. For the two aforementioned tasks which have to be performed it is known to use cell rotors which operate in the manner illustrated in Figs. 1 and 2 of the accompanying drawings.

The present invention deals with an entirely novel construction and method of operating cell rotors and enables a machine with a good efficiency, highest capacity and compact design to be produced by effecting at least the major part of the compression by means of compression waves and at least the major part of the expansion by means of expansion waves which shoot through the cells.

The invention is explained in greater detail by means of the accompanying drawings, in which:

Fig. 1 shows a cross-section through a cell rotor and Fig. 2 one embodiment of the pressure exchanger in longitudinal section.

Fig. 3 shows the development of the periphery of a cell rotor.

Fig. 4 shows the relationship between the pressure ratio in front and behind the rotor and the scavenging velocity.

Fig. 5 shows the development of a cell rotor with helical cells.

Figs. 6a and 6b show the velocity diagrams for straight and sloping cells.

Figure 7:
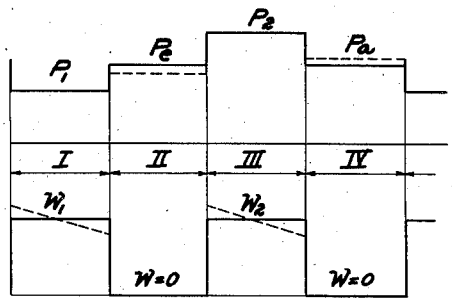
Fig. 7 is a pressure and velocity diagram for one revolution of the rotor.

Figs. 1 and 2 show in diagrammatic form a cell rotor of a known type in cross-section and longitudinal section, respectively. The rotor or wheel is represented by the reference numeral 1, while 4 are the cell walls and 2, 3 the casing. Air is drawn into cell 6 through suction channel 5, for instance, by means of a fan e. This cell 6 after a certain rotation reaches position g and discharges the air into pressure chamber 7. It is assumed that the cell rotor operates as a heat pump. The compressed air is supplemented in a known manner by the air compressed in blower i, is cooled in a heat exchanger k and then by means of fan l is passed back to the cell rotor where it is expanded and discharged at 13.

At the instant when the compression cell comes into communication with the pressure chamber gas is impelled suddenly into the cell. When the expansion cell is opened to the lower pressure chamber gas is expelled suddenly from the former into the latter. Various means are known which serve to prevent the loss occasioned by these pulsations in the gas flow, such as eccentric location of the rotor with movable cell walls or vanes, conduits for a gradual equalization of the pressure in the compression and expansion cells, and the like. These measures certainly result in an improvement in efficiency but the capacity of machines of this kind is very limited either due to mechanical stresses or flow losses in the equalizing conduits. Furthermore, only moderate peripheral speeds and flow velocities can be obtained.

The machine consists of a simple cell rotor with fixed cell walls or vanes as shown in Figs. 1 and 2. The lower pressure stage is provided with a scavenging section in which the fresh gas to be compressed displaces the expansion gas, and in the upper pressure stage there is a scavenging section in which the gas to be expanded displaces the compressed gas. The novel method of operating the machine is achieved by the special position and shape of the fixed and movable channels in the casing, as shown in Fig. 3. This figure represents a development of the periphery of the cell rotor of one embodiment of the invention. 1—1 is the rotor in its developed form, 2—2 and 3—3 are the development of a cylindrical section through the casing on both sides of the rotor. The radial cell walls appear in the figure as straight lines 4. One rotation of the rotor corresponds to a displacement of the developed periphery from left to right. Compression gas flows from the suction space 5 into cells 6 and thus displaces the contents of the cells produced by expansion to space 7. As soon as fresh gas fills the cells the ends of the cells are closed due to the rotation of the runner by a control edge 8 in the casing. The cell contents are still moving when the cell is closed. The sudden closing of the end of the cell produces a pressure wave the height of which depends upon the speed of the rotor and which shoots through the cell from the outlet to the inlet end. Since the cell is moving the wave front describes the dash-dot path 8—9 shown in the figure.

When the entire cell contents have reached a higher pressure level, that is at the instant when the wave front reaches the front end of the cell, it is closed by the control edge 9 so that the compressed gas is trapped and locked up to the higher pressure level.

The cell with its trapped contents moves further to the right. Its front end becomes open at 10 to space 11 in which the expansion gas is at a higher pressure than the contents of the arriving cell. This results in a fresh pressure wave which with approximately the velocity of sound shoots through the cell from the front to the rear along the path 10—12. At the instant when this pressure wave reaches the rear end of the cell it is put into communication with pressure space 13 by means of control edge 12. Behind the pressure wave the gas has begun to move with a velocity depending on the pressure jump. This flow velocity is different from the velocity of sound or the velocity of the wave front. It is generally considerably lower.

Both ends of the cell are now open and its contents are moving. The compressed gas discharges into space 13 and the gas which is to be expanded flows in from space 11, care being taken that the casing is equipped for the correct inflow and discharge conditions.

As soon as a sufficient quantity of the gas which is to be expanded has flowed in, the front end of the cell is closed by the edge 14. The supply of gas is thus interrupted suddenly and an expansion wave is generated which shoots through the cell along the path 14—15. When the expansion wave reaches the opposite end of the cell this latter is closed by edge 15. The entire contents of the cell have come to rest and the pressure is lower than that of the upper pressure stage. At the edge 16 the outlet ends of the cells open, and the contents of the cells which have come to rest commence to flow out into the space 7 until the edge 17 also uncovers the inlet ends, and this movement of the cell contents toward 7 is strengthened by the compression gas at 5 and so on. This results in a fresh expansion wave which sets the cell contents into motion again. Scavenging at the lower pressure stage is thus initiated. The cycle of operations described for the cell is completed and repeats itself. The new principle on which the machine operates is therefore useful compression by means of compression waves and useful expansion by means of expansion waves. The wandering compression and expansion waves effect a transformation between the pressure and kinetic energy of the scavenging movement.

Fig. 4 shows the relationship between the pressure ratio in front and behind the wave and the scavenging velocity. The abscissae A shows the velocity as a ratio to the velocity of sound (Mach number) whilst the ordinates B show the pressure ratio. The scavenging velocity must increase with the pressure ratio. In a rotor with axial cells the gas emerges with a velocity whose axial component is equal to the scavenging velocity and whose tangential component is equal to the peripheral speed of the rotor. At higher speeds the gases emerging from the cells possess considerable energy which can only be partially converted into useful work by means of suitable diffusors.

The outlet energy can be reduced if the axes of the cells are not arranged parallel to the axis of the rotor or in radial planes but at an angle to these planes or helically or spirally.

Fig. 5 shows the development of a pressure exchanger with a rotor having helical cells. The method of operation is fundamentally the same as that already described. Reference numerals 1 to 17 refer to the same elements as in Fig. 3.

Figs. 6a and 6b show the velocity triangles for straight and sloping cells; $w$ is the velocity of flow relative to the cell during scavenging. This velocity determines the pressure ratio. $u$ represents the peripheral velocity of the cell. Relative velocity and peripheral velocity give the resultant absolute velocity $c$. This is the velocity with which the gas emerges from the rotor into the casing. It will be noticed that in Fig. 6a $c$ is considerably larger than $w$; in Fig. 6b, however, $c$ is smaller than $w$.

In axial cells the pressure of the gas increases with the radius as a result of the centrifugal force. When there is a difference of density between the two gases present during scavenging, the pressure increase is greater in the gas of higher density. This upsets the equilibrium within the zone of contact of the two gases and causes the gases to mix. A strong mixture of gases is however unfavourable to the proper functioning of the heat exchange.

If however the cells are helical, the tangential component of the absolute motion is decreased and the centrifugal effect partly or totally suppressed.

Fig. 7 shows in a diagrammatic manner the course of the pressure and the velocity of flow in the center of a cell during one revolution. I is the scavenging section at the lower pressure stage with pressure $P_1$ and velocity $w_1$; II is the compression section with pressure $P_0$ and velocity $w=0$; III is the scavenging section at the upper pressure stage with pressure $P_2$ and velocity $w_2$; IV is the expansion section with pressure $P_a$ and velocity $w=0$.

The velocity of a scavenging stream which is set in motion by a pressure wave is maintained during the entire scavenging period if care is taken that the resistances in the scavenging circuit, both inside and outside the pressure exchanger, are overcome by a fan for instance. On the other hand the velocity can be allowed to decrease during the scavenging period. By this means energy is released which can overcome the resistances in the scavenging circuit. The scavenging fan is thus relieved of its load and depending upon the resistances in one or the other of the scavenging sections, it can be entirely dispensed with or the gas be used to do useful work. The corresponding course of the pressures and velocities are shown by the broken lines in Fig. 7.

On the other hand it is possible to allow the scavenging blower to produce a higher pressure than is necessary to overcome the resistances in the scavenging circuit. By this means the scavenging stream in a cell is accelerated between the beginning and end of the scavenging section. The compression wave at the end of the lower scavenging period will be increased and the gas to be compressed will be trapped at a higher pressure. Similarly at the end of the upper scavenging period the gas to be expanded will be trapped at a lower pressure. More gas is therefore compressed and less gas expanded. As a result of this, for instance the auxiliary blower used with a heat pump must transfer less gas and under certain conditions may even be omitted. The work to be done by the auxiliary blower is transferred to the scavenging blower.

The scavenging velocities at the lower and upper pressure stages do not need to be equal. Within certain limits it is quite safe when as a result of unequal velocities unequal pressure jumps occur. The scavenging velocities and thus also the displaced volumes can be regulated by altering the flow resistances in the scavenging circuits or by altering the pressures produced by the scavenging fans. Generally it is sufficient if one fan is provided in one of the scavenging circuits, for instance in the scavenging circuit having the higher resistance.

When the gas to be expanded has a considerably different density to that of the compressed gas (for instance when the same gas is expanded at a different temperature) the scavenging velocities at the beginning and end of the scavenging sections must be selected differently in accordance with the ratio of the sound velocities because the pressure jumps of the pressure waves depend on the relationship between scavenging and sound velocity (Mach number) as shown in Fig. 4; and the total pressure jumps on the compression and expansion side must be equal. If for instance air is compressed and expanded again at a considerably higher temperature, the scavenging velocities must decrease during the lower scavenging period and increase during the upper scavenging period, so that they are higher for the expansion wave than for the compression wave.

Under certain conditions it is possible that these alterations in scavenging velocities can be obtained without having to adopt special measures. This can be proved to be the case when in the velocity diagram of the type shown in Fig. 6a the velocities $c$ and $w$ are equal. When namely a light gas displaces a heavy gas the kinetic energy of the cell contents decreases in proportion to the masses when the velocity remains constant. The energy which is released serves to accelerate the scavenging stream. It is only necessary to construct the channels in the casing so that the transfer of gas from the cell rotor is as free from losses as possible. If $c$ and $w$ differ (Fig. 6b), the change in velocity must be assisted by external means, scavenging resistance and scavenging pressure. The changes in scavenging velocities which for various reasons are necessary or desirable overlap each other and can under certain conditions mutually balance each other.

The cell rotor described above with straight or helical cells requires only a small driving power to overcome friction losses if the gas enters the rotor parallel to the cell walls. When the gas is allowed to enter with a slight impact in the direction of rotation against the cell walls a special drive can be dispensed with. The scavenging stream in the cell rotor can be much more strongly diverted than is necessary merely to drive the cell rotor. When the momentum in the scavenging stream— i. e., the product of the flow velocity and the mass in flow—increases in the direction of rotation, the cell rotor operates as a turbo-compressor and must be driven from the shaft. The cell rotor assists or replaces the scavenging blower and can under certain conditions also render the supplementary blower $i$ (Fig. 2) superfluous. When the momentum in the direction of rotation is decreased, the cell rotor operates as a turbine. The power delivered at the shaft is at the cost of the scavenging power. The scavenging velocity decreases rapidly from the beginning to the end of the scavenging period. The intermediate pressure $Pe$ (Fig. 7) at which the gas is trapped on the compression side decreases and less gas is compressed. On the other hand the intermediate pressure $Pa$ at which the gas is trapped on the expansion side increases and more gas expands.

Figure 8:
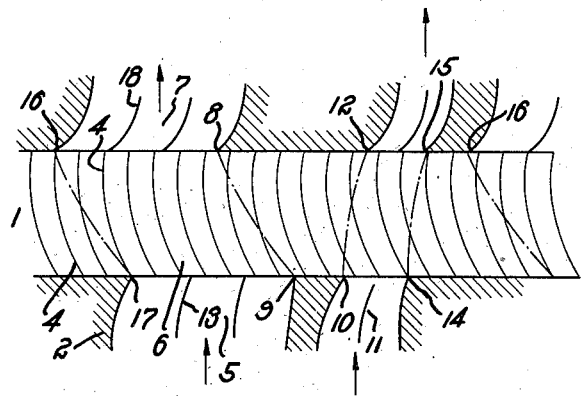
Fig. 8 shows the development of a cell rotor operating as a compressor during scavenging periods.

Fig. 8 shows the development of a cell rotor which operates as a compressor during the scavenging periods. Reference numerals 1–17 indicate the same elements as in Fig. 3. It should be noticed that the channels in the casing provided with blades 18 have a variable direction in accordance with the increasing scavenging velocity. The cells shown in Fig. 8 may be varied in width by varying the angle of inclination of the cell walls 4. By means of a suitable choice of cell height it is possible to obtain a constant or only slightly variable cross-section of cell, such as is generally desired (compare Fig. 13).

Figure 9:
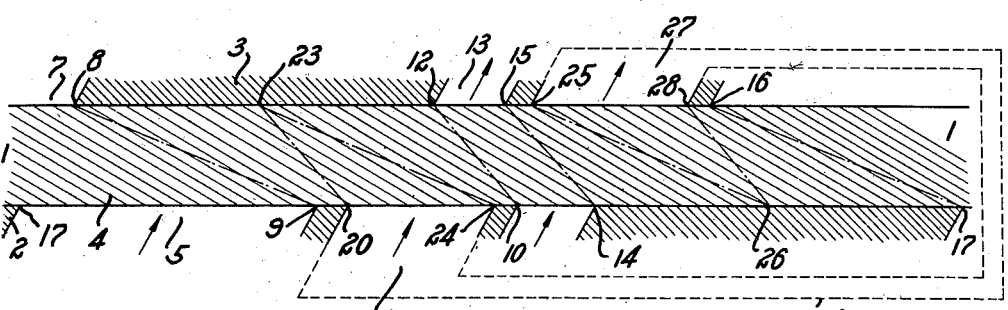
Fig. 9 shows the development of a two-stage cell rotor.

The pressure exchangers described so far, which can be termed single-stage pressure exchangers, operate each with two compression and expansion waves. The pressure jump obtainable per pressure wave cannot be increased indefinitely. Fig. 9 shows the development of a two-stage cell rotor which operates with four compression and expansion waves each.

1 is the development of the cell rotor with inclined cells 4, whilst 2 and 3 are the casing. Scavenging at the lower pressure stage occurs from space 5 to space 7. The first pressure wave is produced at edge 8 which suddenly closes the cell. The second wave occurs at edge 20 where the cell comes into communication with space 21 in which a pressure prevails which is between the lower and upper pressure stage. This space 21 can be supplied with gas through a conduit 22, this gas being taken from the cells in the expansion section. This additional gas can also be taken from another source. The wave reaches the end of the cell at point 23 where it encounters a closed wall, is reflected and shoots through the cell from the rear to the front as the third compression wave. When the wave reaches the front end the cell it is closed by edge 24. During the total transition period of the wave along the path 20—23—24 gas flows from 21 into the cell. The fourth wave is initiated at edge 10 as with a single-stage rotor.

The expansion occurs in a similar sequence: first expansion wave 14—15 at the end of the scavenging, second expansion wave 25—26 when one end of the cell is opened to intermediate space 27 which can be in communication with space 21, reflection of wave at the closed end of the cell up to point 26 and return path 26—28 as the third wave. Whilst the wave follows the path 25—26—28, gas flows from the cell into space 27 and from there to space 21. The fourth expansion wave 16—17 occurs upon the initiation of the lower scavenging process.

Compression waves 20—23—24 and the corresponding expansion waves 25—26—28 can be repeated a number of times. By this means multi-stage pressure exchangers can be obtained. It is also possible to have a single-stage compression and a two-stage expansion, preferably when the expansion gas is hotter than the compression gas. Separate pressure exchangers can also be connected in series.

Figure 10:
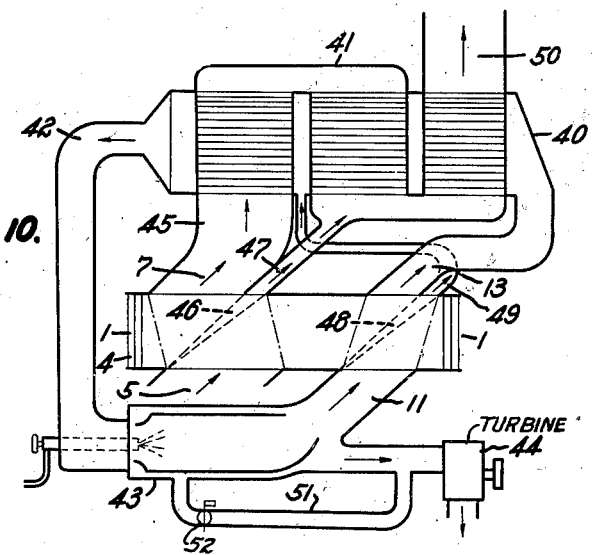
Fig. 10 shows in diagrammatic form the application of the pressure exchanger with a combustion turbine plant.

In order to explain the application of the pressure exchanger more clearly a combustion turbine plant is illustrated diagrammatically in Fig. 10. 1—1 is the developed periphery of the cell runner. Only a few of the cell walls 4 are shown in the drawings. Fresh air enters the rotor at 5, is compressed by two pressure waves and emerges at 13. Compressed air enters the three-stage heat exchanger 41 at 40 where it is further preheated and passes out again at 42. It is then heated further in a combustion chamber 43 where fuel is burnt. Part of the exhaust gases from the combustion chamber are extracted as useful air and can for instance be supplied to a turbine 44. The remainder of the gases from the combustion chamber return at 11 to the pressure exchanger where they are expanded and emerge at 7 in order to flow at 45 into heat exchanger 41, where part of their residual heat is transferred to the compressed air, the gases escaping through the flue 50.

The air entering at 5 displaces the exhaust gas emerging at 7. The line of contact of the two gases is not sharply defined. Due to heat conduction, turbulence, formation of boundary layers at the walls and differences in the mass forces in the gases of different density, there is generally an undesirable mutual penetration of the gases. The zone where this intermingling occurs extends over a wedge-shaped space 46 between the cold and warm streams 5 and 7. A similar zone 48 forms at the upper stage. This mutual penetration can be rendered to a great extent harmless when the mixing zones are scavenged and care is taken that practically only cold air is locked in and only hot gases are locked out.

Heat is transferred through the cell walls from the hot to the cold gas. The heating up of the cold gas and the cooling down of the hot gas during the short period which elapses from the time the gas flows into the cell until it is closed, is detrimental. The contents of the cell are not uniformly heated during this period but only a layer in the vicinity of the cell wall. In many cases, especially when the cells are inclined, the centrifugal force on the boundary layer is greater than on the gas core. The boundary layer flows outwards along the walls. In the scavenging section where there is no difference in pressure between adjoining cells, recesses and channels can be provided in the casing which trap the outflowing boundary layer and conduct it away with mixed gas.

Figure 11:
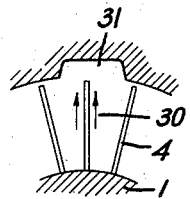
Fig. 11 shows part of a cell rotor to an enlarged scale.

Fig. 11 represents a section of a pressure exchanger. The arrows 30 indicate the boundary layer flow; 31 is the channel in the casing which serves to trap the boundary layer which is whirled out.

When, as in Fig. 10, there is a heat exchanger, it is an advantage if the scavenged mixed gases are separately trapped by channels 47 and 49 and either conducted to an intermediate stage or not at all to the heat exchanger.

In the arrangement shown in Fig. 10 an air pipe 51 with a control element 52 leads to turbine 44. Since the walls of the cell rotor are alternately in contact with cold and hot gases it can often stand a higher temperature than the turbine 44 which is operated only by hot gas. As a result of this it is necessary to be able to regulate both temperatures independently, this being possible by means of air pipe 51. Turbine 44 can also be exclusively supplied with preheated air through pipe 51 if it is for instance desired to keep it free from ashes. The turbine generally operates with higher flow velocities than the cell rotor and is more liable to erosion.

Figure 12:
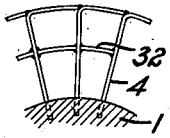
Fig. 12 shows part of a modified form of cell rotor.
Figure 13:
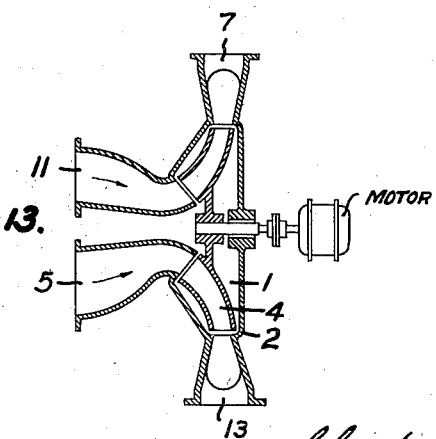
Fig. 13 shows a modified form of pressure exchanger.

The rotor of the pressure exchanger can be built with cells which are open or closed at the periphery. Fig. 1 shows an embodiment with open cells and Fig. 12 one with closed cells. The cell walls are bent over at the ends and welded together. High cells can be subdivided by an intermediate wall 32 which takes part of the centrifugal forces acting on the cell contents. The intermediate wall can also have a continuation in the casing whereby the flow can be adjusted to the various peripheral velocities of the inner and outer cell parts. The generatrix of the body of revolution formed by the cells can be axial, diagonal or radial. It can be straight or curved. Fig. 13 shows a pressure exchanger whose cross-section is similar to that of a centrifugal blower. This shape can be used to advantage when the cell rotor operates as a turbocompressor during the scavenging period.

From the description of the operation of the pressure exchanger it will be noted that it is important that the ends of the cells should be accurately opened at the right moment by the control edges. It is therefore an advantage to construct at least a number of the control edges so as to be adjustable. In Fig. 5 for instance, edges 8 and 12 can be displaced by means of levers 35 and 36. Their position can therefore be adjusted to suit any alterations in the velocity of sound due to a change in temperature.

Although the time required by the control edges to open the ends of the cells is small, pressure waves with a flattened front will result. The first pressure impulse which occurs when the cell is opened wanders a certain distance along the cell until its entrance is entirely free and the gas can enter without hindrance. Care must be taken that this path relative to the length of the cell is not too long; this can be achieved by a suitable choice of cell division, peripheral velocity, and angle of inclination of the cells. On the other hand when fixing these values the flow losses and the heat transfer have to be taken into account. Finally there are cases where in order to suit various operating conditions variable angles of flow are necessary, these being obtained by means of rotatable running or guide blades.

I claim:

1. A pressure exchanger comprising a rotor carrying a plurality of cells extending therethrough, a stator casing including inlet means adjacent one end of said cells for supplying a gas at one pressure stage to said cells and for supplying a gas at a high pressure to said cells at a further point along the circumference of the rotor, outlet means adjacent the other end of said cells whereby said first gas is delivered from said cells at an increased pressure and said second gas is delivered from said cells at a decreased pressure, and control surfaces in operable relation to the ends of said rotor cells, said inlet and outlet means being spaced in said control surfaces to open the inlet ends of the rotor cells to inflow of the first gas, while opening the outlet ends of the cells at a point preceding the first opening of the inlet ends of the cells by approximately the time for a pressure wave to traverse the cells, thereafter to close the outlet ends of said cells at the point where the first gas has traversed the cells for a period of approximately an even multiple of the time for a pressure wave to traverse the cells while closing the inlet ends of the cells at a point trailing the first closure of the outlet ends of the cells by approximately the time for a pressure wave to traverse the cells, thereafter to open the inlet ends of the cells to inflow of the second gas while opening the outlet ends of the cells at a point trailing the opening of the inlet ends of the cells by approximately the time for a pressure wave to traverse the cells, and to close the outlet ends of the cells at the point where the second gas has traversed the cells while closing the inlet ends of the cells at a point preceding the second closure of the outlet ends of the cells by approximately the time for a pressure wave to traverse the cells for a period approximately an even multiple of the time for a pressure wave to traverse the cells, and thereafter to again open the inlet ends of the cells to inflow of the first gas until the second gas is scavenged by the first gas, whereby at least a substantial part of the compression of the first gas and the expansion of the second gas are effected by the generation of compression and expansion waves which traverse the cells through said rotor.

2. A pressure exchanger comprising a rotor carrying a plurality of cells extending therethrough, a stator casing including inlet means adjacent one end of said cells for supplying a gas at one pressure stage to said cells and for supplying a gas at a higher pressure to said cells at a further point along the circumference of the rotor, outlet means adjacent the other end of said cells whereby said first gas is delivered from said cells at an increased pressure and said second gas is delivered from said cells at a decreased pressure, and control surfaces in operable relation to the ends of said rotor cells, said inlet and outlet means being spaced in said control surfaces to open the inlet ends of the rotor cells to inflow of the first gas, while opening the outlet ends of the cells at a point preceding the first opening of the inlet ends of the cells by approximately the time for a pressure wave to traverse the cells, thereafter to close the outlet ends of said cells at the point where the first gas has traversed the cells for a period at least twice the time for a pressure wave to traverse the cells while closing the inlet ends of the cells at a point trailing the first closure of the outlet ends of the cells by approximately the time for a pressure wave to traverse the cells, thereafter to open the inlet ends of the cells to inflow of the second gas while opening the outlet ends of the cells at a point trailing the opening of the inlet ends of the cells by approximately the time for a pressure wave to traverse the cells, and to close the outlet ends of the cells at the point where the second gas has traversed the cells while closing the inlet ends of the cells at a point preceding the second closure of the outlet ends of the cells by approximately the time for a pressure wave to traverse the cell for a period at least twice the time for a pressure wave to traverse the cells, and thereafter to again open the inlet ends of the cells to inflow of the first gas until the second gas is scavenged by the first gas, whereby at least a substantial part of the compression of the first gas and the expansion of the second gas are effected by the generation of compression and expansion waves which traverse said cells through said rotor.

3. A pressure exchanger as defined in claim 2 including control edges in said control surfaces adjacent the inlet and outlet openings in the casing and means for adjusting the position of the control edges in a circumferential direction.

4. A pressure exchanger as defined in claim 2 wherein the cells extend axially through the rotor.

5. A pressure exchanger as defined in claim 2 wherein the cells extend helically through the rotor whereby the velocities of the gases in the inlet and outlet means in the casing are reduced.

6. A pressure exchanger as defined in claim 2 wherein the incoming gas stream enters the cells with an impact in the direction of rotation of the rotor so as to propel the rotor.

7. A pressure exchanger as defined in claim 2 wherein the cell walls are bent in a direction to cause the incoming gas stream to propel the rotor.

8. A pressure exchanger as defined in claim 2 wherein the cell walls are bent to such an extent that the momentum of the incoming gas stream at the outlet of the cell in the direction of rotation is greater than at the inlet so that the cell rotor operates as a power-absorbing turbo-blower in the scavenging section.

9. A pressure exchanger as defined in claim 2 wherein the cell walls are bent to such an extent that the momentum of the incoming gas stream at the outlet of the cell in the direction of rotation is greater than at the inlet so that the cell rotor operates as a power-absorbing turbo-blower in the scavenging section generating more pressure than is necessary to overcome the resistances at constant speed.

10. A pressure exchanger as defined in claim 2 wherein the cell walls are bent to such an extent that the momentum of the incoming gas stream at the outlet of the cell in the direction of rotation is smaller than at the inlet so that the rotor operates as a power-supplying turbine in the scavenging section.

11. A pressure exchanger comprising a rotor carrying a plurality of cells extending therethrough, a stator casing including inlet means adjacent one end of said cells for supplying a gas at one pressure stage to said cells and for supplying a gas at a high pressure to said cells at a further point along the circumference of the rotor, outlet means adjacent the other end of said cells whereby said first gas is delivered from said cells at an increased pressure and said second gas is delivered from said cells at a decreased pressure, and control surfaces in operable relation to the ends of said rotor cells, said inlet and outlet means being spaced in said control surfaces to open the inlet ends of the rotor cells to inflow of the first gas, while opening the outlet ends of the cells at a point preceding the first opening of the inlet ends of the cells by approximately the time for a pressure wave to traverse the cells, thereafter to close the outlet ends of said cells at the point where the first gas has traversed the cells for a period of approximately an even multiple of the time for a pressure wave to traverse the cells while closing the inlet ends of the cells at a point trailing the first closure of the outlet ends of the cells by approximately the time for a pressure wave to traverse the cells, thereafter to open the inlet ends of the cells to inflow of the second gas while opening the outlet ends of the cells at a point trailing the opening of the inlet ends of the cells by approximately the time for a pressure wave to traverse the cells, and to close the outlet ends of the cells at the point where the second gas has traversed the cells while closing the inlet ends of the cells at a point preceding the second closure of the outlet ends of the cells by approximately the time for a pressure wave to traverse the cells for a period approximately an even multiple of the time for a pressure wave to traverse the cells, and thereafter to again open the inlet ends of the cells to inflow of the first gas until the second gas is scavenged by the first gas, whereby at least a substantial part of the compression of the first gas and the expansion of the second gas are effected by the generation of compression and expansion waves which traverse the cells through said rotor, said stator casing including a passage having an inlet opening to the cells beginning at a point trailing the first closure of the outlet ends of the cells by approximately twice the time for a pressure wave to traverse the cells and extending for a period of approximately twice the time for a pressure wave to traverse the cells and having an outlet opening from the cells beginning at a point preceding the second closure of the outlet ends of the cells by approximately twice the time for a pressure wave to traverse the cells and extending for a period of approximately twice the time for a pressure wave to traverse the cells whereby to bring about a second pair of pressure waves in the compression and expansion zones.

12. A pressure exchanger as defined in claim 2 wherein the scavenging section provided by the opening of the inlet ends of the cells to inflow of the first gas is of such length that at least a portion of the mixed incoming and displaced gases is scavenged.

13. A pressure exchanger as defined in claim 2 wherein channels are provided in the casing to trap the boundary layers of gas centrifugally projected by the cell walls.

14. A pressure exchanger as defined in claim 2 wherein the casing is provided with separate channels for scavenging at least a portion of the mixed incoming and displaced gases.

15. A pressure exchanger as defined in claim 2 including means for heating the higher pressure gas, a turbine for expanding a portion of the compressed gas, and conduit means for separately passing portions of the heated, compressed gas to the turbine and to the pressure exchanger.

CLAUDE SEIPPEL.